United States Patent [19]

Chattha et al.

[11] Patent Number: 4,713,427

[45] Date of Patent: Dec. 15, 1987

[54] HIGH SOLIDS COATING COMPOSITIONS

[75] Inventors: Mohinder S. Chattha, Livonia; Ares N. Theodore, Farmington Hills, both of Mich.

[73] Assignee: E. I. Du Pont de Nemours and Company, Wilmington, Del.

[21] Appl. No.: 432,896

[22] PCT Filed: Aug. 9, 1982

[86] PCT No.: PCT/US82/01090

§ 371 Date: Aug. 9, 1982

§ 102(e) Date: Aug. 9, 1982

[87] PCT Pub. No.: WO84/00770

PCT Pub. Date: Mar. 1, 1984

[51] Int. Cl.$^4$ .................. C08G 12/32; C08G 12/12; C08L 61/24; C08L 61/28
[52] U.S. Cl. ............................. 525/510; 525/514
[58] Field of Search .................. 525/514, 510, 511

[56] References Cited

U.S. PATENT DOCUMENTS

| | | | |
|---|---|---|---|
| 3,291,858 | 12/1966 | Oosterhof et al. | 525/511 |
| 3,410,926 | 11/1968 | Hicks | 525/511 |
| 3,470,266 | 9/1969 | Batzer et al. | 525/514 |
| 3,553,284 | 1/1971 | Reimhafer et al. | |
| 3,600,459 | 8/1971 | Vasta . | |
| 3,849,383 | 11/1974 | Fetscher et al. | |
| 3,960,979 | 6/1976 | Khanna . | |
| 3,992,346 | 11/1976 | Hartman et al. | |
| 4,018,848 | 4/1977 | Khanna . | |
| 4,169,825 | 10/1979 | Yapp et al. | 525/438 |
| 4,196,270 | 4/1980 | Chattha | 525/110 |
| 4,350,790 | 9/1982 | Chattha | 525/110 |
| 4,418,182 | 11/1983 | Chattha | 525/514 |

*Primary Examiner*—John C. Bleutge
*Assistant Examiner*—Robert E. L. Sellers, II
*Attorney, Agent, or Firm*—Hilmar L. Fricke

[57] ABSTRACT

A thermosetting coating composition with excellent weatherability adapted for use as an automotive topcoat which upon curing forms a hard, glossy, durable coating. The coating composition, which reacts in situ during curing, is characterized by comprising a mixture of:

(A) polyol having a number average molecular weight ($\overline{MHD}$ n) of between about 130–5000;

(B) dicarboxylic acid anhydride comprising at least about 50 weight percent of alkyl hexahydrophthalic anhydride;

(C) epoxy having one or more epoxide groups per molecule and a number average molecular weight ($\overline{M}_n$) of between about 130–1500; and (D) an amine-aldehyde crosslinking agent.

29 Claims, No Drawings

HIGH SOLIDS COATING COMPOSITIONS

Reference is made to commonly assigned and concurrently filed U.S. applications Ser. Nos. 425,191 entitled "Glycidyl-Hydroxy-Acrylic High Solids Coating Compositions" and 432,897, now abandoned, "Acrylic-Hydroxy-Epoxy High Solids Coating Compositions", both to Chattha et al.

TECHNICAL FIELD

This invention relates to high solids thermosetting coating compositions which, when cured, provide an automotive topcoat demonstrating hardness, high gloss, outstanding durability and excellent resistance to solvents and water. More particularly, this invention relates to low viscosity, high solids compositions having superior weathering properties and comprising a mixture of a low molecular weight polyol, dicarboxylic acid anhydride including at least about 50 weight percent of alkyl hexahydrophthalic anhydride, epoxy, and amine-aldehyde crosslinking resins. The composition mixture reacts in situ during curing at elevated temperatures to form the coating.

BACKGROUND OF THE INVENTION

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, complex and/or consuming composition formulation, poor durability and low solvent and water resistance of the coating.

Compositions which have been proposed to overcome these deficiencies are taught in U.S. applications Ser. Nos. 334,698, 334,800 and 334,801, filed Dec. 12, 1981 in the name of Chattha. In these compositions, branched diols react with anhydrides of dicarboxylic acids to produce hydroxy acids and polyacids. The composition of such a mixture is largely dictated by the stoichiometry of the reactants employed. These acid products can then be reacted with epoxies to produce hydroxy resins. Subsequently, a composition comprising a mixture of these hydroxy resins and amine-aldehyde crosslinking agent can be applied to a substrate and cured at elevated temperatures to obtain crosslinked structures. Unexpectedly, we have now found that all the materials use to prepare these prior compositions can be singly combined and all of the aforementioned reactions carried out in situ during curing on the substrate to obtain high solids coatings with excellent physical properties. While not wishing to be bound by theory, it is believed that in this reaction sequence the polyol reacts with the anhydride to produce acid functionality which further reacts with the epoxy to produce hydroxy moiety; then at higher temperatures, the amine-aldehyde reacts with hydroxy functionality to produce a crosslinked network. This crosslinking reaction is facilitated by the unconsumed acid present in the composition.

DISCLOSURE OF THE INVENTION

The low viscosity thermosetting coating composition of this invention preferably contains greater than about 60% by weight, more preferably greater than 70% by weight, of nonvolatile solids. The composition is characterized in that it comprises a mixture of:

(A) polyol having a number average molecular weight ($\overline{M}_n$) of between about 130–5000, preferably between about 150 and about 3500;

(B) dicarboxylic acid anhydride comprising at least about 50 weight percent of alkyl, preferably methyl, hexahydrophthalic anhydride;

(C) epoxy having one or more, preferably two, epoxide groups per molecule and having a number average molecular weight ($\overline{M}_n$) between about 130 and about 1500; and (D) amine-aldehyde crosslinking agent. The composition reacts in situ during curing at elevated temperatures to form the coating.

The dicarboxylic acid anhydride is included in an amount so as to provide between about 0.25 and about 1.5, preferably between about 0.3 and 1.2, anhydride groups per hydroxyl group on the polyol. The epoxy is included in an amount so as to provide at least about 1.0, preferably between about 1.1 and 1.2 epoxide groups per anhydride group. The amine aldehyde is included in the composition in an amount sufficient to provide at least about 0.60, preferably between about 0.75 and 2.75, nitrogen crosslinking functional groups for each hydroxyl group initially present on the polyol (A).

In addition, the coating composition of this invention may include conventional additives such as catalysts, antioxidants, U.V. absorbers, flow control or wetting agents, antistatic agents, pigments, plasticizers, solvents, etc. The oligomers of this composition are also compatible with nonaqueous dispersions (NAD's), which are generally used as flow control additives.

This invention overcomes the above mentioned deficiencies of prior high solids coating compositions and provides a high solids composition particularly suitable for use as an automotive topcoat clear or pigmented, which exhibits outstanding weatherability.

Advantageously, since the composition of this invention is applied to the substrate as an essentially unreacted mixture of low molecular weight materials, little or no volatile solvent is generally required to maintain a desirable low application viscosity, i.e., the composition can be very high solids.

The composition of this invention, being of essentially single step formulation offers a distinct commercial advantage over those compositions whose formulation includes a series of reaction steps prior to curing, since such reaction steps generally require heat, agitation and monitoring for extended periods of time.

Yet another advantage of the subject composition is that by means of the in situ reactions during curing, carboxyl functionality is generated which, until it is later consumed by further reaction, acts as a catalyst for the crosslinking reaction.

BEST MODE FOR CARRYING OUT THE INVENTION

The high solids coating compositions of this invention provide a system which is particularly suitable for those applications requiring a coating having high gloss, hardness, durability and high solvent and water resistance as well as superior weatherability. The components of the coating composition of this invention are combined to form a homogeneous mixture, which may then be applied to a substrate and cured at elevated temperatures.

Each of the components of the coating composition, the amounts of each of the components required to achieve the desired results of the invention and a method for applying the composition are described hereinafter in greater detail.

(A) Polyol

One material in the coating of this invention is a polyol having a number average molecular weight ($\overline{M}_n$) between about 130 and about 5000 more preferably between about 150 and about 3500. As used herein, the term polyol means a compound having two or more hydroxy groups. This polyol may suitably be selected from, but is not limited to, monomeric polyols such as aliphatic diols, triols, tetrols, etc., polyhydroxy esters and polyhydroxy oligomers, as well as mixtures of suitable polyols.

Exemplary of such monomeric polyols suitable for use in the subject compositions are aliphatic diols, preferably branched diols, wherein the aliphatic branched diol preferably contains only one primary hydroxyl group, i.e., second hydroxyl of the diol is therefore preferably a secondary or tertiary hydroxyl, preferably a secondary hydroxyl. Additionally, it is preferable that the hydroxyl groups not be on adjacent carbons and more preferably be separated by at least three carbon atoms. The carbon chain may also be interrupted or substituted by non-interfering functionality. Most suitably, this branched diol is an $C_3$–$C_{10}$ aliphatic branched diol which may be chosen from, but not limited to, 2-ethyl-1,3-hexane diol, 1,3-butane diol, 1,2-butane diol and 1,2-propane diol, with 2-ethyl-1,3-hexane being most preferred. The choice of other suitable diols would be within the skill of one in the art. Mixtures of these diols can also be used.

Exemplary of suitable aliphatic polyols having more than two hydroxyls per molecule include, but are not limited to, glycerol, 1,2,6-hexanetriol and 2-(hydroxymethyl)-2-methyl-3-propanediol Other materials having the required hydroxyl functionality and suitable for use as the polyol in the subject composition include polyhydroxy esters. The hydroxy functional esters useful in the invention are preferably fully saturated products prepared from aliphatic dibasic acids containing 2-20 carbon atoms, and short chain glycols of up to and including 21 carbon atoms. The molecular weight of these materials ranges from about 200 to about 2500 and the hydroxyl number ranges from about 30 to about 230. U.S. Pat. No. 4,181,784 to Chattha et al is hereby expressly incorporated by reference for teachings relative the preparation of such hydroxy functional esters.

Among the preferred polyesters are products derived from esterification of ethylene glycol and 1,4 butane diol with adipic acid, ethylene glycol and 1,2 propylene glycol with adipic acid, azelaic acid and sebasic acid copolyester diols and mixtures thereof.

The hydroxy functional oligomers useful as the polyol in the compositions of the invention are oligomers preferably having a molecular weight of between about 150 and about 3000. Such oligomers may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

Oligoesters (i) is prepared by reacting a dibasic carboxylic acid with a monoepoxide and preferably includes those formed by reacting $C_6$–$C_{12}$ dicarboxylic aliphatic acids with ethylene oxide or propylene oxide.

The preparation of oligoesters from carboxylic acids and polyepoxides is well known and is described, for example in U.S. Pat. Nos. 2,456,408 and 2,635,141. Numerous hydroxy functional oligoesters within this general category will be apparent to those skilled in the art. The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein.

(B) Dicarboxylic Acid Anhydride

The anhydride used in this composition comprises at least 50 percent by weight, and up to 100 percent by weight of alkyl hexahydrophthalic anhydride, wherein the alkyl group preferably comprises up to about 7 carbons, more preferably up to 4 carbons. Most preferably, the alkyl hexahydrophthalic anhydride comprises methyl hexahydrophthalic anhydride. The remainder of the anhydrides, i.e., 0 to about 50 weight percent, more preferably 0 to about 20 weight percent, and most preferably 0 to about 10 percent by weight, are selected from a variety of anhydrides, which include but are not limited to, hexahydrophthalic, 2-dodecene-1-ylsuccinic, tetrahydrophthalic, methyl tetrahydrophthalic, camphoric anhydrides, and mixtures of suitable anhydrides.

The anhydride is included in the composition in an amount sufficient to provide between about 0.25 and about 1.5, more preferably between about 0.30 and about 1.2, most preferably between about 0.5 and 1.1 anhydride groups per pendant hydroxyl group initially present on the polyol. During curing, it appears that the anhydride reacts with hydroxyl groups on the polyol forming carboxyl groups. In compositions wherein excess anhydride (i.e., relative hydroxy groups) is present, it appears that the excess anhydride will later react with the hydroxyl groups generated by subsequent carboxyl-/epoxide reactions to form more carboxyl groups. Since the epoxy is present in an amount based on the amount of anhydride, these carboxyl groups will subsequently be reacted with epoxy to form (regenerate) hydroxyl functionality.

(C) Epoxy

This composition also includes an epoxy having one or more, preferably two, epoxide groups per molecule and having a molecular weight between about 130 and about 1500. It is believed that during curing the carboxyl group opens the epoxide ring of the epoxy in an esterification reaction which generates hydroxyl groups. The epoxy is present in the composition in an amount sufficient to provide at least about 1.0, more preferably between about 1.0 and 1.2, most preferably between about 1.0 and 1.1 epoxide groups for each anhydride group present in the composition, i.e., essentially all of the pendant carboxyl groups resulting from the initial hydroxy (polyol)-anhydride reaction and, in the case of excess anhydride, the carboxyl groups resulting from subsequent hydroxyl-excess anhydride reactions will be reacted with an epoxide to regenerate hydroxyl functionality.

The epoxy suitable for use in this invention is a low molecular weight epoxy containing one or more epoxide groups per molecule. Preferably, the epoxy used in the invention composition is a diepoxide. This epoxy can be a liquid or a solid and can be either a single epoxy or a mixture of suitable epoxides. Examples of suitable epoxies include, but are not limited to, $C_4$–$C_{10}$ monoepoxides such as alkylene oxides, cyclic oxides, glycidyl esters and glycidyl ethers. Among numerous examples of such monoepoxides are 1,2-epoxy pentane, 1,2-epoxy decane, styrene oxide, cyclohexane oxide, n-butylglycidyl ether, glycidol acetate and glycidol. Suitable diepoxides include those which are the condensation products of bisphenol-A with epichlorohydrin, examples of which are commercially available as Epon 828, 1001, 1004, 1007 and 1009 (marketed by Shell Oil Company), Araldite 6010 and 8001 (marketed by Ciba-Geigy); ester type diepoxides such as diglycidyl phthalate, diglycidyl adipate, and diglycidyl glutarate; cycloaliphatic diepoxides such as dicycopentaxediene and vinyl cyclohexane dioxide; and aliphatic ether type diepoxides such as ethylene glycol, diglycidyl ether, 1,2-propylene glycol, diglycidyl ether and 1,4-butanediol diglycidyl ether such as Araldite RD-2 (marketed by Ciba-Geigy). Epoxies having more than two epoxides groups per molecule such as Ciba-Geigy Epoxy Resins 0500 and 0163 and Dion 711 Epoxide (Diamond Shamrock, Morristown, N.J. may also be used. The epoxies may be substituted by non-interfering functionality such as hydroxyl or the carbon chain may be interrupted by oxygen and may contain ethylenic unsaturation; however a saturated epoxy and one containing no hydroxyl functionality is preferable. It is also preferred that the epoxy of this composition contain terminal epoxide groups.

Catalysts are generally included in the composition to accelerate the epoxide/carboxyl reaction. Suitable catalyst for this epoxide/carboxyl reaction are well known in the art.

Preferred esterification catalysts for the carboxyl/epoxy reaction useful in preparation of hydroxy functional oligomers are the tetraalkyl ammonium salts such as tetra methyl ammonium chloride, tetraethyl ammonium bromide and trimethyl benzyl ammonium chloride as well as metal salts of carboxylic acid, such as potassium octoate or chromium III octoate. Other useful esterification catalysts include: metal halides such as chromium trichloride, ferric trichloride, and aluminum trichloride; mercaptans and thioethers such as octyl mercaptan, dimercapto propanol and dimercaptodiethyl ether; tertiary amines such as triethyl amine, pyridine, dimethylandine, quinoline, B-picoline, ethylpyridine; and the like. Still other catalysts known to catalyze carboxy/epoxy reactions will be apparent to those skilled in this art.

(D) Amine-aldehyde Crosslinking Agent

Another essential component of the paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are amine-aldehyde resins such as condensation products of formaldehyde with melamine, substituted melamine, urea, benzoquanamine or substituted benzoguanamine. Preferred members of this class are methylated melamine-formaldehyde resins such as hexamethoxylmelamine. These liquid crosslinking agents have substantially 100 percent nonvolatile content as measured by the foil method at 45° C. for 45 minutes. For the preferred high solids compositions of the invention it should be recognized that it is important not to introduce extraneous diluents that would lower the final solids content of the coating. Other suitable amine-aldehyde crosslinking agents are well known and would be apparent to one skilled in the art.

Particularly preferred crosslinking agents are the amino crosslinking agents sold by American Cyanamid, Wayne, N.J. under the trademark "Cymel." In particular, Cymel 301, Cymel 303, Cymel 325 and Cymel 1156, which are alkylated melamine-formaldehyde resins are useful in the compositions of this invention.

The crosslinking reactions are known to be catalytically accelerated by acids. Therefore, the unconsumed carboxyl group acts as a catalyst for the crosslinking reaction. In addition, if desired, catalysts may be added to the composition which accelerate the crosslinking reaction. One such catalyst, for example, is p-toluene sulfonic acid and the amine salts thereof. Other useful catalysts are well known to those skilled in the art. Selection of optimal cure temperature would be well within the skill of one in the art. The amine-aldehyde materials function as a crosslinking agent in the composition of the invention by reacting with the hydroxyl functionality of the composition, which functionality was either present initially on the polyol and nonreacted or regenerated during subsequent in situ reactions of initially present hydroxyl functionality.

In order to achieve the outstanding properties which make these coating compositions particularly useful as automotive topcoat materials, it is essential that the amount of amino crosslinking agent be sufficient to substantially crosslink the hydroxyl functionality in the coating composition. Therefore, the amino crosslinking agent should be included in the composition in an amount sufficient to provide at least about 0.60, preferably between about 0.75 and about 2.75 nitrogen crosslinking functional groups for each hydroxyl group included in the composition either as an initially present and unreacted hydroxyl group on the polyol or as a regenerated hydroxyl group, (i.e., in situ by means of reactions with anhydride and epoxy). The hydroxyl groups present in the composition and available for crosslinking can therefore be essentially taken to be equal to the hydroxyl groups initially present on the polyol.

OTHER MATERIALS

In addition to the above discussed components, other materials may be included in the coating compositions of the invention. These include materials such as catalysts, antioxidants, U.V. absorbers, solvents, surface modifiers and wetting agents as well as pigments.

It is generally suitable and preferably, in order to achieve the preferred high solids content of the coating compositions of the invention, to use little or no volatile solvent in the composition. However, when desirable suitable solvents employed include those commonly used, such as toluene, xylene, methyamyl ketone, acetone, 2-ethoxy-1-ethanol, 2-butoxy-1-ethanol, diacetone alcohol, dimethylglutarate, dimethyladipate or mixtures thereof. In some embodiments of the subject composition, it may be desirable to incorporate solvent into the coating composition in order to facilitate application of the coating composition, as by spray application. As mentioned above, the nonvolatile solids content of the high solids coating composition is preferably at least 60%, and more preferably 70% or more, thus limiting the amount of solvent included in the composition. However, while the composition of the subject invention is particularly suitable for use as a high solids composition, it is also suitable for use as a low solids composition. Determination of optimal solids content for a given application would be within the skill of one in the art.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1–10 percent by weight of a copolymerized monoethylenically unsaturated carboxylic acids such as methacrylic acid, acrylic acid or itaconic acid, cellulose acetate butyrate, silicone oils or mixtures thereof. Of course, the choice of surface modifiers or wetting agent is dependent upon the type of surface to be coated and selection of the same is clearly within the skill of the artisan.

The coating composition of the invention also may include pigments. The amount of pigment in the coating composition may vary, but preferably is between about 3 and about 45 weight percent based on the total weight of the paint composition. If the pigment is metallic flake, the amount generally ranges from about 1 to about 20 weight percent.

For many applications of the coating compositions of the invention, particularly high solids compositions, it may be desirable to employ flow control additives to provide sag free coatings. Among numerous such materials, NAD's such as described by Porter (S. Porter, Jr., and B. N. McBane, U.S. Pat. No. 4,025,474, May 24, 1977) are compatible with these oligomeric coating compositions. These particle dispersions may be included in an amount up to 15% by weight of the total composition. Other types of NAD's such as described by D. L. Maker and S. C. Peng (U.S. Pat. No. 3,814,721, June 4, 1974) or by S. K. Horvath (U.S. application Ser. No. 292,853, filed Aug. 14, 1981, now U.S. Pat. No. 4,415,681) also may be included in the paint composition.

APPLICATION TECHNIQUES

The coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying a high solids coating composition, particularly when applying the same to automobiles as topcoats, is spray coating through the nozzle of a spray gun.

High solids paints have in the past caused some difficulty in spray coating techniques because of the high viscosity of the materials and resultant problems in clogging of spray guns. However, because the compositions of this invention can demonstrate relatively low viscosity, considering the preferred high solids content, they can be applied by spray coating techniques.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

Five (5) parts Eponex DRH-151.1 (Shell Chemical Co.), 1.5 parts 2-ethyl-1,3-hexane diol and 4 parts of Cymel 325 are dissolved in 10 parts of butyl acetate and 0.05 part of Cordova Accelerator AMC TM -2 (Chromium complex catalyst available from Cordova Chemical, Sacramento, Calif.) is added to it. Methyhexahydrophthalic anhydride (3.5 parts) is added to the above solution. The resulting formulation is drawn on a primed panel and it is baked at 125° C. for 15 minutes to obtain hard, glossy coatings with excellent xylene and methyl ethyl ketone resistance.

EXAMPLE 2

Five (5) parts of Araldite CY-178 (Ciba-Geigy) and 6.2 parts of Cymel 301 are dissolved in 3.7 parts 2-ethyl-1,3-hexanediol. One (1) part of p-toluene sulfonic acid is dissolved in 4.2 parts of methylhexahydrophthalic anhydride and this solution was added to the above composition. Cordova Accelerator AMC TM -2 (0.1 part) is added to the resulting composition and it is drawn on a primed steel panel which is baked at 130° C. for 18 minutes to obtain a hard, glossy film with excellent adhesion and solvent resistance.

EXAMPLE 3

Nineteen (19) parts Epon 828 (Shell Chemical Co.), 15 parts 2-ethyl-1,3-hexanediol, 26 parts Cymel 325 and 0.3 part Cordova Accelerator AMC TM -2 are dissolved in 21 parts methyl amyl ketone. A solution of 2.2 parts adipic anhydride in 14.4 parts of methylhexahydrophthalic anhydride is added to the above solution and the resulting formulation is applied by spraying to primed steel panels. The panels are baked at 130° C. for 21 minutes to obtain coatings with excellent hardness, adhesion, gloss and solvent (xylene and methyl ethyl ketone) resistance.

EXAMPLE 4

941 grams of azelaic acid are heated to melt in a three-necked flask equipped with a stirring rod, dropping funnel and a condenser. Sixteen grams of Cordova Accelerator AMC TM -2 are added to the above melt and 725 grams of propylene oxide are added dropwise with continuous stirring; ice-cold water is continuously circulated through the condenser. After the addition is complete, the reaction mixture is heated for half an hour and then a slight vacuum is applied to remove any excess of propylene oxide.

Twenty (20) parts of Epon 828, 18 parts of the above oligoester, 27 parts Cymel 301, 0.5 parts Cordova Accelerator AMC TM -2 and 0.09 part p-toluene sulfonic acid are dissolved in 21 parts of butyl acetate and 17 parts of methylhexahydrophthalic anhydride are added to above solution. The resulting composition is applied by spraying to primed steel panels which are baked at 130° C. for 23 minutes to obtain hard, glossy coatings with excellent adhesion and solvent resistance.

EXAMPLE 5

Twenty (20) parts Eponex DRH-151.1 (Shell Chemical Co.), 17 parts of hydroxy ester Desmophen KL5-2330 (Rohm & Haas Chemical Co., Philadelphia, Penn.), 25 parts Cymel 301 and 0.9 part Cordova Accelerator AMC ᴛᴍ -2 are dissolved in twenty parts butyl acetate. Eighteen (18) parts of methylhexahydrophthalic anhydride are added to the above solution and the resulting composition is applied by spraying to primed steel panels. The panels are baked at 130° C. for 18 minutes to obtain coatings with excellent hardness, adhesion, gloss and solvent (xylene and methyl ethyl ketone resistance.

EXAMPLE 6

Thirty (30) parts of caprolactone based oligoester (mol. wt. 530, PCP-0200, Union Carbide), 27 parts of Epon 828 (Shell Chemical Co.), 32 parts of Cymel 325 and 1.2 parts of Cordova Accelerator AMC-2 are dissolved in 35 parts of butyl acetate and 23 parts of methylhexahydrophthalic anhydride are added to the above solution. The resulting formulation is applied by spraying to primed steel panels which are baked at 132° C. for 18 minutes to obtain hard, glossy coatings resistant to xylene and methyl ethyl ketone.

EXAMPLE 7

A solution of 1 part of succinic anhydride in 3.1 parts of methylhexahydrophthalic anhydride is substituted for the anhydride used in Example 2. The resulting composition is drawn on a primed panel and is baked at 131° C. for 19 minutes to hard, glossy and solvent resistant coating.

EXAMPLE 8

2-Ethyl-1,3-hexanediol (3504 g) was dissolved in butyl acetate (1542 g) and was placed under nitrogen in a round bottom flask equipped with a mechanical stirrer. Dibutyltin dilaurate (1.54 g) was mixed with isophorone-diisocyanate (2664 g) and this mixture was added dropwise to the diol solution with continuous stirring. The temperature was allowed to rise to 50° C. and then was maintained at this temperature. After the addition was complete, the reaction mixture was stirred for two hours.

Five (5) parts of the above hydroxy oligomer, 4 parts Epon 828, 0.05 part Cordova Accelerator AMC ᴛᴍ -2 and 6 parts Cymel 325 are dissolved in 7 parts of butyl acetate. Methylhexahydrophthalic anhydride (4.3 parts) is added to the above solution and the resulting composition is applied by drawing to primed steel panels. The panels are baked at 132° C. for 18 minutes to obtain coatings with excellent hardness, adhesion, gloss and solvent resistance.

EXAMPLE 9

Thirty (30) parts of hydroxy oligomer from Example 8, 16 parts Epon 828, 0.3 part Cordova Accelerator AMC ᴛᴍ -2, 37 parts Cymel 325, 6 parts of aluminum flakes (65% in naphtha) and 12 parts flow control additive (U.S. Pat. No. 4,025,474) are mixed well with 33 parts of butyl acetate. Thirteen (13) parts of methylhexahydrophthalic anhydride are added to the above mixture and the resulting composition is applied by spraying in three coats to primed steel panels. The panels are flashed for five minutes at room temperature and then are baked at 129° C. for 21 minutes to obtain silver metallic coatings with excellent physical properties.

EXAMPLE 10

One hundred and thirty (130) grams of adipic acid, 119 grams 1,6-hexane diol, 80 grams xylene and 0.3 grams phosphoric acid are placed in a reaction flask equipped with a Dean-Start water separator. The reaction mixture is refluxed with continuous removal of water of condensation to obtain a hydroxy ester of 980 molecular weight.

Ten (10) parts of the above hydroxy ester, 7 parts of Epon 828, 12 parts Cymel 325 and 0.1 part Cordova Accelerator AMC ᴛᴍ -2 are dissolved in 11 parts of methyl amyl ketone. Six (6) parts methylhexahydrophthalic anhydride is added to the above solution and the resulting formulation is applied by spraying to primed steel panels which are baked at 132° C. for 17 minutes to obtain coatings with excellent gloss, hardness, adhesion and solvent resistance.

EXAMPLE 11

A millbase is prepared by dispersing titanium dioxide in the hydroxy ester described in Example 10 with a high speed cowl's blade. The composition of the millbase is: Oligomer 16%, titanium dioxide 65% and methyl amyl ketone 20%.

Thirty (30) parts of the above millbase, 11 parts Eponex DRH-151.1 (Shell Chemical Co.), 11.5 parts Cymel 325 and 0.15 part Cordova Accelerator AMC ᴛᴍ -2 are dissolved in 15 parts of n-butyl acetate and 8.8 parts of methylhexahydrophthalic anhydride are added to this solution. The resulting formulation is applied by spraying to primed steel panels which are baked at 132° C. for 17 minutes to obtain white coatings with excellent gloss, hardness, adhesion and solvent (xylene and methyl ethyl ketone) resistance.

INDUSTRIAL APPLICABILITY

It will be obvious from the foregoing that this invention has industrial applicability, particularly to the automotive industry, and provides a coating with exterior weatherability and commercial advantages.

We claim:

1. A thermosetting coating composition comprising a mixture of components, said components of said mixture comprising:
    (A) polyol having a number average molecular weight ($\overline{M}_n$) of between about 130 and about 5000;
    (B) dicarboxylic acid anhydride comprising at least about 50 percent by weight of alkyl hexahydrophthalic anhydride, said dicarboxylic acid anhydride being included in said composition in an amount so as to provide between about 0.25 and about 1.5 anhydride groups for each hydroxyl group on said polyol;
    (C) epoxy having one or more epoxide groups per molecule and having a number average molecular weight ($\overline{M}_n$) of between about 130–1500, said epoxy being included in said composition in an amount so as to provide at least about 1.0 epoxide group for each anhydride group; and
    (D) amine-aldehyde crosslinking agent included in said composition in an amount sufficient to provide at least about 0.60 nitrogen crosslinking functional groups for each hydroxyl group initially present in said composition on said polyol (A), said coating composition being an essentially unreacted mixture of said components.

2. A coating composition according to claim 1, wherein said polyol is selected from the group consisting of aliphatic polyols, polyhydroxy esters and polyhydroxy oligomers.

3. A coating composition according to claim 2, wherein said aliphatic polyol is a branched diol wherein the hydroxyl groups of said diol are not attached to adjacent carbon atoms.

4. A coating composition according to claim 3, wherein said diol is 2-ethyl-1,3-hexane diol.

5. A coating composition according to claim 1, wherein the alkyl group of said alkyl hexahydrophthalic anhydride comprises a lower alkyl group having up to about seven carbons.

6. A coating composition according to claim 1, wherein said dicarboxylic acid anhydride comprises at least about 80 percent by weight of an alkyl hexahydrophthalic anhydride.

7. A coating composition according to claim 1 or 6, wherein said dicarboxylic acid anhydride is included in said composition so as to provide between about 0.30 and about 1.2 anhydride groups for each hydroxyl groups on said polyol.

8. A coating composition according to claim 5 or 6, wherein said alkyl hexahydrophthalic anhydride is methyl hexahydrophthalic anhydride.

9. A coating composition according to claim 1, wherein up to about 50 percent by weight of said dicarboxylic acid anhydride comprises an anhydride selected from the group consisting of hexahydrophthalic anhydride, 2-dodecene-1-ylsuccinic anhydride, tetrahydrophthalic anhydride, methyl tetrahydrophthalic anhydride, camphoric anhydride, and mixtures thereof.

10. A coating composition according to claim 1, wherein said epoxy contains two epoxide groups per molecule.

11. A coating composition according to claim 1 or 10, wherein said epoxy is a saturated epoxy.

12. A coating composition according to claim 11, wherein said epoxy contains terminal epoxide functionality.

13. A coating composition according to claim 1, wherein said amine-aldehyde crosslinking agent is selected from the group consisting of condensation products of formaldehyde with melamine, substituted melamine, urea, benzoquanamine and substituted benzoquanamine, and mixtures of said condensation products in an amount sufficient to provide between about 0.75 and about 2.75 nitrogen crosslinking functional groups for each hydroxyl group initially present in said composition on said polyol (A).

14. A coating composition according to claim 1, wherein said composition further comprises up to 15 weight percent, based on the total weight of said composition, of a flow control additive.

15. A coating composition according to claim 1, wherein said dicarboxylic acid anhydride consists of methyl hexahydrophthalic anhydride and said epoxy is a diepoxide.

16. A high solids thermosetting coating composition which contains greater than about 60 percent by weight of nonvolatile solids and which, except for pigments and other nonreactive components, comprises a mixture of components, the components of said mixture comprising:
(A) polyol having a number average molecular weight ($\overline{M}_n$) of between about 130 and about 5000;
(B) dicarboxylic acid anhydride comprising at least about 50 percent by weight of alkyl hexahydrophthalic anhydride, said dicarboxylic acid anhydride being included in said composition in an amount so as to provide between about 0.25 and about 1.5 anhydride groups for each hydroxyl group on said polyol;
(C) epoxy having one or more epoxide groups per molecule and having a number average molecular weight ($M_n$) of between about 130 and about 1500, said epoxy being included in said composition in an amount so as to provide at least about 1.0 epoxide groups for each anhydride group; and
(D) amine-aldehyde crosslinking agent included in said composition in an amount sufficient to provide at least about 0.60 nitrogen crosslinking functional groups for each hydroxyl group initially present in said composition on said polyol (A), lsaid coating composition being an essentially unreacted mixture of said components.

17. A coating composition according to claim 16, wherein said polyol is selected from the group consisting of aliphatic polyols, polyhydroxy esters and polyhydroxy oligomers.

18. A high solids coating composition according to claim 17, wherein said aliphatic polyol is a branched diol wherein the hydroxy groups of said diol are not attached to adjacent carbon atoms.

19. A high solids coating composition according to claim 18, wherein said diol is 2-ethyl-1,3-hexane diol.

20. A high solids coating composition according to claim 16, wherein the alkyl group of said alkyl hexahydrophthalic anhydride comprises a lower alkyl group having up to about seven carbons.

21. A high solids coating composition according to claim 16, wherein said dicarboxylic acid anhydride comprises at least about 80 percent by weight of an alkyl hexahydrophthalic anhydride.

22. A high solids coating composition according to claim 16 or 21, wherein said dicarboxylic acid anhydraide is included in said composition in an amount so as to provide between about 0.30 and about 1.2 anhydride groups for each hydroxyl groups on said polyol.

23. A high solids coating composition according to claim 20 or 21, wherein said akyl hexahydrophthalic anhydride is methyl hexahydrophthalic anhydride.

24. A high solids coating composition according to claim 16, wherein up to 50 percent by weight of said dicarboxylic acid anhydride employed in the preparation of said copolymer is selected from the group consisting of hexahydrophthalic anhydride, 2-dodecene-1-ylsuccinic anhydride, tetrahydrophthalic anhydride, methyl tetrahydrophtalic anhydride, camphoric anhydride, and mixtures thereof.

25. A high solids coating composition according to claim 16, wherein said epoxy contains two epoxide groups per molecule.

26. A high solids coating composition according to claim 16 or 25, wherein said epoxy is a saturated epoxy.

27. A high solids coating composition according to claim 16, wherein said epoxy contains terminal epoxide functionality.

28. A high solids coating composition according to claim 16, wherein said dicarboxylic acid anhydride consists of methyl hexahydrophthalic anhydride and said epoxy is a diepoxide.

29. A high solids coating composition according to claim 16, wherein said amine-aldehyde crosslinking agent is selected from the group consisting of condensation products of formaldehyde with melamine, substituted melamine, urea, benzoquanamine and substituted benzoquanamine and mixtures of said condensation products and is included in an amount sufficient to provide between about 0.75 and about 2.75 nitrogen crosslinking functional groups for each hydroxyl group initially present in said composition on said polyol (A).

* * * * *